United States Patent [19]

Moe

[11] Patent Number: 4,566,625

[45] Date of Patent: Jan. 28, 1986

[54] METHOD FOR DIFFUSION WELDING

[76] Inventor: Per H. Moe, Amtmann Bangs gate 7, N-3000 Drammen, Norway

[21] Appl. No.: 568,195

[22] PCT Filed: Apr. 13, 1983

[86] PCT No.: PCT/NO83/00010

§ 371 Date: Dec. 12, 1983

§ 102(e) Date: Dec. 12, 1983

[87] PCT Pub. No.: WO83/03565

PCT Pub. Date: Oct. 27, 1983

[30] Foreign Application Priority Data

Apr. 13, 1982 [NO] Norway .................................. 821208
Apr. 12, 1983 [NO] Norway .................................. 831296

[51] Int. Cl.$^4$ ............................................. B23K 20/00
[52] U.S. Cl. .................................. 228/265; 228/173.2; 228/193
[58] Field of Search .................. 228/173 A, 214, 220, 228/221, 265, 104, 193, 186

[56] References Cited

U.S. PATENT DOCUMENTS

| | | | |
|---|---|---|---|
| 2,747,066 | 5/1956 | Brace | 228/220 X |
| 2,819,517 | 1/1958 | Pursell | 228/219 |
| 3,091,846 | 6/1963 | Henry | 228/219 X |
| 3,110,961 | 11/1963 | Melill et al. | 228/219 X |
| 3,260,786 | 7/1966 | Katzschner | 228/104 X |
| 4,084,739 | 4/1978 | Koltz et al. | 228/219 |
| 4,238,067 | 12/1980 | Osmotherley et al. | 228/219 |
| 4,413,655 | 11/1983 | Brown | 228/219 X |
| 4,415,114 | 11/1983 | Hallenbeck | 228/219 X |

FOREIGN PATENT DOCUMENTS

| | | | |
|---|---|---|---|
| 2106016 | 4/1983 | United Kingdom | 228/221 |
| 2106425 | 4/1983 | United Kingdom | 228/221 |

Primary Examiner—Kenneth J. Ramsey
Assistant Examiner—M. Jordan
Attorney, Agent, or Firm—Darby & Darby

[57] ABSTRACT

A method for joining parts of metal by diffusion welding comprises initially the establishing of a joint between the opposed bounding surfaces, the joint having generally increasing height from the periphery towards the middle. The joint is provided with a connection to an external source for flushing gas and a vacuum source. During the preliminary heating and pressing together of the parts the joint is supplied with an inert for reducing flushing gas, e.g., hydrogen, until the joint by diffusion welding is closed along its periphery. Thereafter, a vacuum may be pumped in the joint, where upon further heating, quick compression and a certain holding time provide complete diffusion welding of the parts. It is also suggested to reduce the cross-section of the parts in the joint area and press these out to their original cross-section during the diffusion welding.

8 Claims, 7 Drawing Figures

METHOD FOR DIFFUSION WELDING

SUMMARY OF THE INVENTION

The present invention relates to a method for joining parts of metal by means of diffusion welding, comprising the following steps: establishing a joint between opposed bounding surfaces on the respective parts to be joined, heating of the parts to a predetermined temperature in at least those areas bordering on the joint, joining the parts by pressing the parts together, and cooling the parts.

Advantages and disadvantages of diffusion welding are known i.a. from Welding Handbook, 7. edition, volume III, pages 312 et sec.

Among the advantages can be mentioned that joints can be formed having properties and microstructures which are very similar to those of the base material and joining is possible where the form of the work pieces makes it difficult to use other methods. Furthermore, joints can be made having minimal deformations and without consecutive machining or forming.

Among the disadvantages can be mentioned that the cost of the equipment is usually very high, a fact that limit the size of the parts that may be diffusion welded in an economic manner. Furthermore, the necessity of supplying heat and a high compressive force in an environment such as vacuum or protective atmosphere will give rise to grave problems as regards the necessary equipment and therefore constitute a substantial limitation in the applicability of the method. In addition, one has assumed that the method requires very careful and thorough surface preparation and, besides, that it requires more time than conventional methods.

Nevertheless, it is an object of the present invention to adapt a method of the above mentioned type for making a pipeline for offshore transportation of gas and oil. Making of such pipelines today is done by welding together pipe sections manually or by $CO_2$ automatic equipment on board a laying vessel. Usually the welding of the pipes occurs at several stations concurrently in order to increase the laying speed. Due to practical reasons the stations are placed on a horizontal line and several welders can weld on each station concurrently. The finished pipe is let out behind the laying vessel over a so-called "stinger" which prevents the pipe from breaking directly behind the laying vessel and runs in a S-shaped curve down towards the sea floor. A certain tension is maintained in the laid pipeline, and for this purpose the laying vessel must have anchors by means of which it is pulling itself forward during the laying of the pipeline. These anchors must from time to time be moved forward in front of the vessel and for this purpose it is necessary to use auxiliary vessels.

For various reasons it would be desirable to be able to run the pipeline generally vertically downwards from the laying vessel, so that the pipeline would run in a single bend down towards the sea floor. This would i.a. entail better control of the stresses in the laid pipeline, and one could avoid anchors and auxiliary vessels and instead make do with dynamic positioning of the laying vessel. With the pipeline vertically oriented on board the laying vessel, however, it would be very difficult to use more than one welding station. With the present slow welding procedures this would therefore not give sufficient laying speed to be of practical interest.

According to the present invention it is provided a method which makes it possible to join two pipe sections so quickly that sufficient laying speed can be obtained in order to use vertical orientation of the pipeline on board the laying vessel, thus enjoying the advantages this will entail.

This is obtained according to the invention by a method of the above mentioned type, which is characterized in that the joint at the outset is given the form of a cavity which has a generally increasing height from the periphery towards the middle and is provided with at least one connecting conduit, in that the cavity of the joint during the heating first is supplied with an inert or reducing flushing gas until the joint is tightly closed along its periphery, in that the cavity of the joint thereafter may be put under vacuum via the connecting conduit, and in that the joint thereafter is pressed together with a predetermined speed for the further diffusion welding.

By means of the stated form of the joint one obtains high surface pressure along the periphery of the joint at the beginning of the method. Therefore, diffusion can start along the periphery at such low temperatures that oxidation of the surfaces are avoided. Flushing with inert gas prevents access of oxygen so that oxidation is prevented. If a reducing gas is used, one can remove oxides which previously may have formed on the surfaces of the joint. After closing of the joint along the periphery in this way, which will manifest itself in that flushing gas no longer escapes, one may connect the connecting conduit to a vacuum source so that the joint is put under vacuum. This will remove residual gases and make oxides and other impurities dissociate to a certain degree upon increasing temperature. By adapting temperature and pressure the joint is concurrently closed quickly, whereupon complete diffusion welding can take place in a short time. Quick compression is advantageous because it produces higher pressure in the joint area, which is due to the creep stress of the material increasing with the speed of deformation.

According to an advantageous feature of the invention, at least one of the bounding surfaces of the joint is provided with serrations along the periphery. This will ensure sufficient escape of flushing gas during the early phases of the joining.

Furthermore, it is very advantageous to provide at least one of the bounding surfaces of the joint with a concave form. Thereby an advantageous stress distribution is obtained during the final compression of the parts, with resulting assurance of complete fusion along the entire joint.

A further advantageous form of the joint is obtained if at least one, preferably both bounding surfaces are given conical form. The conical form is easier to machine in a sufficiently exact manner, and if both surfaces are conical, one convex and the other concave, one will obtain a self-aligning effect between the parts when they are pressed together. Such a form will also provide good assurance of complete fusion.

In order to increase the contact pressure in the joint area during compression, it is suggested according to the invention to reduce the cross section of the parts in the joint area. Thereby a pressure in the joint area is obtained which is several times higher than the uniaxial creep stress of the material at the prevailing temperature, the result being quicker and better diffusion.

Several different inert flushing gases may be used, but helium is preferred because during its manufacture it is cooled down to such a temperature that it is virtually guaranteed to be oxygen free. Besides, commercially available and reliable helium detectors can be used to control that the periphery of the joint is absolutely closed before the vacuum is applied.

If one instead uses a reducing gas for flushing, hydrogen will be very advantageous. Not only will it remove any oxide layers but it will also make it possible to observe visually if the joint is closed because any leaking hydrogen will burn on the surface. Hydrogen will not have any harmful effect on the relatively soft structural steels to be joined by the method.

According to the invention it is also proposed to provide the joint with an activating alloy, i.a. 60/40 Palladium/Nickel. This alloy may be introduced as a thin strip or possibly be applied on one or both bounding surfaces by means of electroplating. This will i.a. result in reduced diffusion time.

The connecting conduit for supplying flushing gas or removing gas for pulling a vacuum, may advantageously be arranged in one of the parts to be joined, preferably near its periphery. Thereby the conduit may be plugged immediately after the diffusion welding by means of a deep welding electrode or Plasma-TIG while the temperature of the parts still is sufficiently high, for instance 400°–600° C.

BRIEF DESCRIPTION OF THE DRAWINGS

The invention shall be further explained with reference to the exemplifying embodiments shown in the accompanying drawings.

DESCRIPTION OF THE PREFERRED EMBODIMENTS

Figures 1, 2:
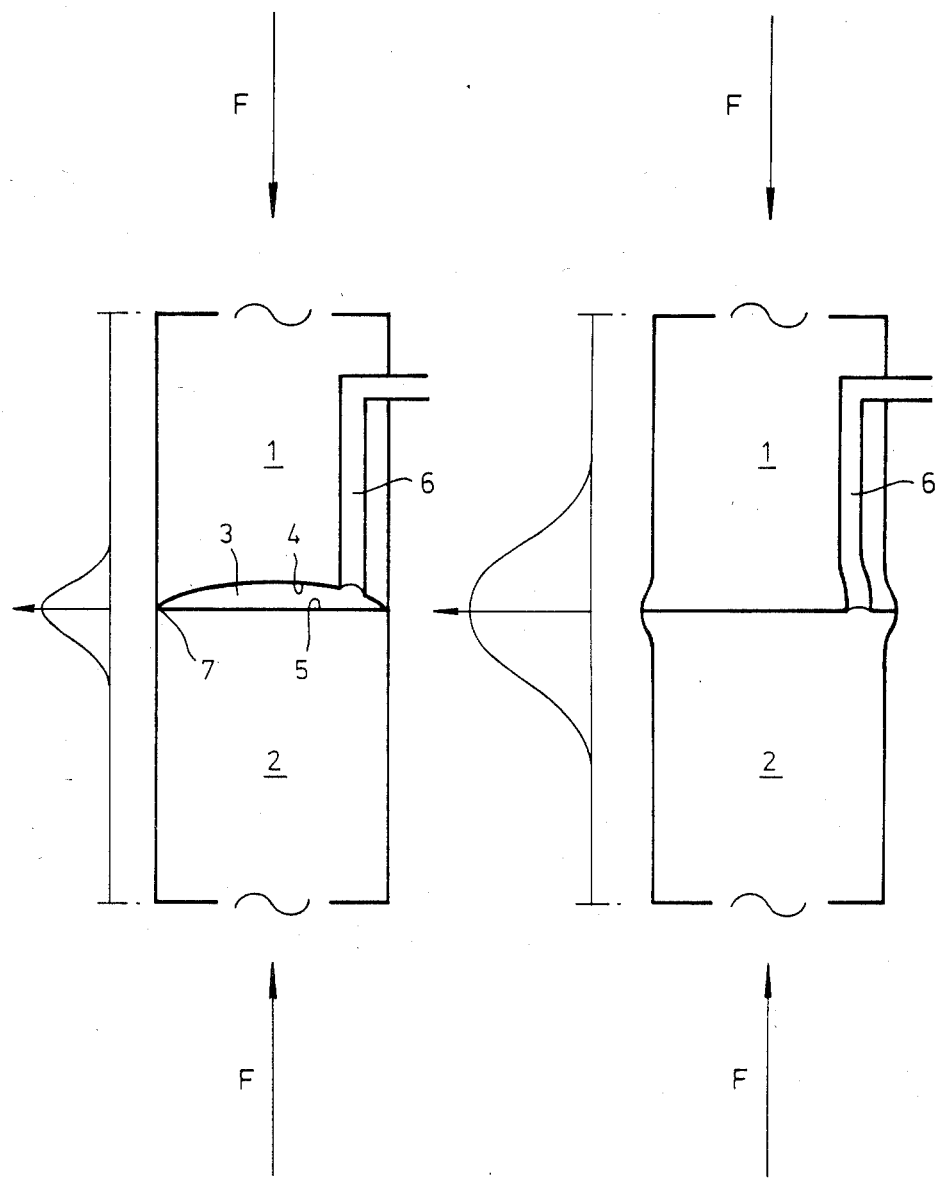
FIGS. 1 and 2 show a first embodiment of two parts at beginning and completed diffusion welding, respectively.

Corresponding parts are given the same reference numerals in all the figures.

FIG. 1 shows a section through a portion of two parts 1 and 2, which may be bolts of structural steel such as ST 52-3. FIG. 1 may also be visualized as showing an axial section through a thick-walled pipe, the axis of the pipe being at the left of the figure. Between the parts 1 and 2 a joint 3 is formed, which is bounded by a concavely curved bounding surface 4 on the part 1 and a plane bounding surface 5 on the part 2. A connecting conduit 6 is arranged in the part 1, said conduit opening into the cavity 3 of the joint and with its other end being connectably alternately with a source of flushing gas and a vacuum source (not shown). The arrows F indicate a variable compressing force, while the bell-shaped curve to the left of the parts 1 and 2 indicates the axial temperature distribution in the parts.

When the parts are to be joined, they are first brought in the position shown in FIG. 1 and subjected to a suitable compressing force F. This force may be created by means of a simple jack system (not shown), which for instance may comprise a clamping ring on each of the parts 1, 2, the clamping rings being interconnected by means of hydraulic cylinders. Other forms may of course be envisioned, depending upon the form and cross section of the parts. Thereupon the heating is started, for instance by means of an induction coil (not shown). Concurrently, flushing gas is supplied through the connecting conduit 6. The flushing gas will first leak out along the periphery 7 of the joint due to minor irregularities or serrating on the bounding surfaces of the joint. The purpose of the flushing is to keep oxygen away from the joint surfaces in order to prevent oxidation of these during the heating, possibly also to remove oxides that may already be present. Regardless of how well the bounding surfaces 4, 5 have been cleaned before the welding, even a short exposure to the oxygen of the air will cause an oxide layer of a thickness in the order of 350–1000 Å, depending on the air temperature and humidity.

When the temperature of the material near the periphery 7 of the joint has reached 600°–800° C., for instance with a temperature distribution as shown schematicly to the left in FIG. 1, diffusion between the parts 1, 2 will occur under a suitable compressing force F so that the joint 3 is closed along the periphery 7. This may be registered in several ways, for instance in that gas no longer leaks out of the joint, or in that a pressure imposed on the cavity 3 of the joint no longer decreases.

When the joint thus is closed along its periphery 7, the connecting conduit 6 is connected to a vacuum source, which thereupon reduces the pressure in the cavity 3 to about $10^{-4}$ torr. Concurrently, the temperature of the parts 1, 2 is increased as suggested schematicly by the curve to the left in FIG. 2, to a maximum temperature of about 1350° C. With a suitable compressing force F the joint 3 will be closed in a matter of seconds. This result is schematicly shown in FIG. 2. Complete diffusion welding will take place in the course of 15–30 minutes. (However, one has obtained complete welding in diffusion times as short as 8 minutes at about 1350° C.) Thereafter the parts are cooled in calm air down to about 600° C., which will take about 4 minutes for a material thickness of 40 mm. At this temperature the connecting conduit may be plugged, i.a. by means of a deep welding electrode or Plasma-TIG welding.

Figures 3, 4:
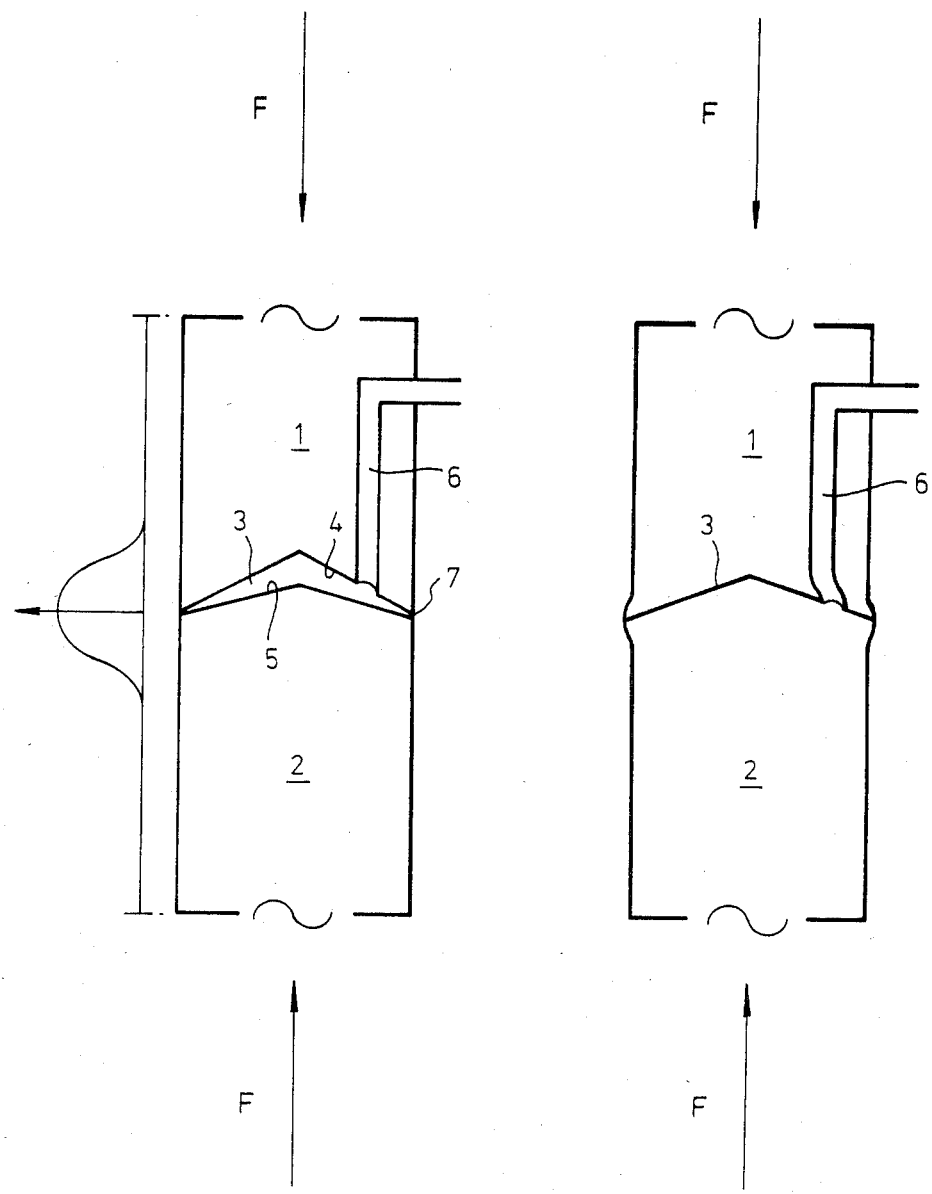
FIGS. 3 and 4 show a second embodiment of the two parts at beginning and completed diffusion welding, respectively.

FIG. 3 shows two parts 1 and 2 with generally the same outer form as in FIG. 1. However, the welding joint 3 here has a different form, its bounding surfaces 4 and 5 both being conical, one concave and the other convex. The top angles are different so that the joint will have increasing thickness towards the middle. The distance between the apices of the joint surfaces can amount to about 10% of the thickness of the parts 1, 2. The conical form of the bounding surfaces 4, 5 makes the parts 1, 2 self-aligning when they are pressed together. The conical form also helps to avoid insufficient diffusion in the middle of the joint, as easily could happen if the lower bounding surface 5 was plane and the upper bounding surface 4 conically concave.

Otherwise, joining of the parts 1, 2 takes place in the same manner as indicated with respect to FIGS. 1 and 2. The final result is schematicly shown in FIG. 4.

The pressure during the diffusion welding is a very important parameter which is difficult to control. According to the Welding Handbook previously mentioned it is supposed that the pressure cannot be brought higher than the uniaxial creep stress of the material at the temperature prevailing at any time without using forms to prevent floating. The use of such forms is cumbersome and entails increased cost, and in some applications such forms cannot be used due to lack of access. Since the diffusion speed generally increases with the square of the pressure, by increasing the pressure to the double or triple of the creep stress, one could bring the diffusion time down to about one fourth or one ninth, respectively, of the corresponding diffusion time for uniaxial pressure. Alternatively one could permit considerably more of oxides on the joint surfaces and thereby possibly delete flushing of the joint with a reducing gas.

In order to obtain such high pressures, the invention aims at establishing a triaxial stress condition in the joint area. It will be known that in tensile testing of thicker test rods a contraction will occur by shear deformation, a cleavage fracture finally taking place in the middle zone. This cleavage fracture is caused by the axial tension in the middle being very much higher than the yield stress of the material, the material on both sides of the contraction holding back by means of radial stresses. For this reason the axial stress increases, the yielding subsiding when the difference between the axial stress and the radial stress becomes less than the yield stress (Trescas principle).

Figures 5, 6:
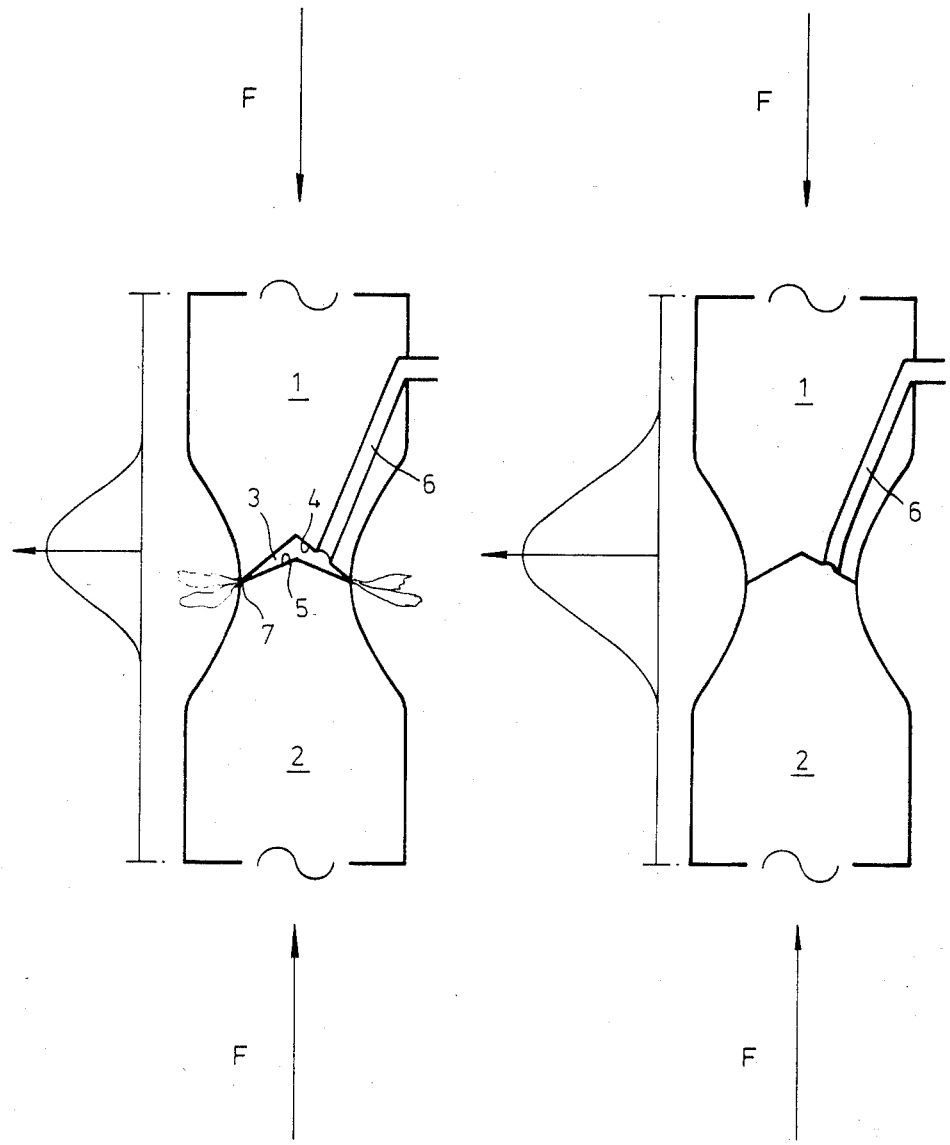
FIGS. 5 and 6 show a further exemplifying embodiment of two parts at beginning and completed diffusion welding, respectively.

According to the invention one aims at utilizing the triaxial phenomenon by providing the parts 1, 2 with a substantial constriction in the joint area as compared to the adjacent material. An example is shown in FIG. 5. In this example hydrogen is used as flushing gas, as is evidenced by the flames indicated along the periphery of the joint.

Figure 7:
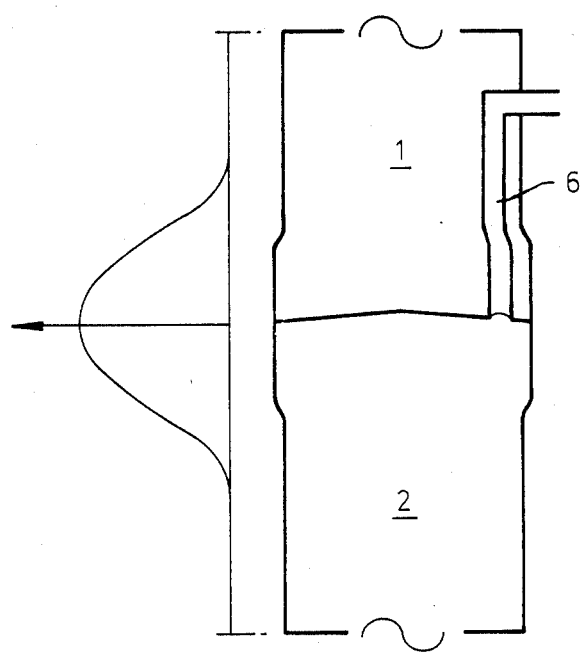
FIG. 7 shows the parts of FIG. 6 upon further compression.

When the flames disappear one knows that the joint is closed, i.e. one does not have to use any form of detection equipment in this connection. When the joint has been reduced and closed along the edge, application of the full compressive force will make the joint close under a very complicated stress picture of dynamic character. The triaxial stress condition exactly at the closing moment will, due to the constriction and the relatively cold surrounding material, give stresses transversely of the joint which are 5–6 times the creep stress for equally thick parts. This situation is illustrated in FIG. 6. Next, the parts are pressed together with a relatively modest force until they have obtained generally the same cross section over the entire length, as is suggested in FIG. 7.

Thus, one has obtained the correct shape in the welded parts without the use of an external form, a very high contact pressure in the deciding phase, and a distribution of oxides that might have been present to double the area or more, with a corresponding thinning of the oxide layer and increasing globular conversion, including accelerated recrystallization.

When the desired thickness has been reached, the compressive force may be removed and the diffusion time and temperature be held until the residual pores have been closed by recrystallization. If a much quicker joining is desired, this can be obtained by electroplating the joint surfaces or introducing in the joint a strip of activating alloy, for instance of the type Pd/Ni 60/40.

Due to the very high stresses occuring in the joint area when it is constricted as shown in FIG. 5, it is supposed that the original form of the joint and the pre-finishing of the joint surfaces are less critical.

Tests performed with the method according to the invention by using bolts of structural steel ST 52-3 having 40 mm diameter have given excellent results with respect to for instance ductility and tensile strength. More than 60% elongation has been measured in the heat effected zone for bolts which have been bent to hair needle shape. The rupture surface showed essentially shear fracture.

It will be understood that the invention may also be advantageously utilized for other purposes than fabrication of large pipelines. For instance, it may be used in welding joints in trusses for bridges and offshore structures.

It is mentioned above that serration may be used on one or both of the bounding surfaces of the joint along their periphery in order to ascertain discharge of flushing gas during the preliminary phases of the welding. In certain cases it may be advantageous to use a slight serration on the entire bounding surface. Such serration will give an echo during later ultrasonic testing if the joint is not completely fusioned.

I claim:

1. An improved method for joining one metal part to another metal part by diffusion welding, said metal parts being elongate and having a generally constant first cross section, comprising the steps:
    establishing a joint between opposed bounding surfaces on said one and said other parts, said opposed surfaces defining therebetween, before welding, a cavity with generally increasing height from the periphery of said cavity toward the middle thereof, said one part having a connecting conduit passing through said part and communicating with said cavity, said parts each having a reduced cross section in the area of said joint, before welding;
    heating said one and said other parts to a predetermined temperature at least in areas of said parts bordering said joint;
    pressing said one and said other parts together toward said joint;
    supplying a reducing flushing gas to said cavity via said conduit during said heating and said pressing until said joint is tightly closed, said opposed surfaces being diffusion welded at at least said periphery of said cavity;
    further pressing said parts together, with a predetermined speed, until said areas having initially reduced cross sections have second cross sections, after welding, substantially equal to said generally constant first cross section of said elongate parts; and
    cooling said parts.

2. The method according to claim 1 wherein at least one of said opposed bounding surfaces has a concave form.

3. The method according to claim 1 wherein at least one of said opposed bounding surfaces has a conical form.

4. The method according to claim 1 wherein both of said opposed bounding surfaces have a conical form, one surface being concave and the other being convex.

5. The method according to claim 1, wherein said reducing gas is hydrogen.

6. The method according to claim 1 wherein said conduit communicates with said cavity near said periphery thereof.

7. The method of claim 1 wherein said opposed bounding surfaces are provided with an activating alloy.

8. The method of claim 1 wherein at least one of said opposed bounding surfaces is serrated at least at said periphery.

* * * * *